United States Patent
Ichikawa et al.

(10) Patent No.: US 7,689,067 B2
(45) Date of Patent: Mar. 30, 2010

(54) NESTED MODULATOR

(75) Inventors: Junichiro Ichikawa, Chiyoda-ku (JP);
Kaoru Higuma, Chiyoda-ku (JP);
Futoshi Yamamoto, Chiyoda-ku (JP);
Satoshi Oikawa, Chiyoda-ku (JP);
Shingo Mori, Chiyoda-ku (JP); Sunao Kurimura, Tsukuba (JP); Kenji Kitamura, Tsukuba (JP); Tetsuya Kawanishi, Koganei (JP); Masahiro Tsuchiya, Koganei (JP); Masayuki Izutsu, Koganei (JP)

(73) Assignees: Sumitomo Osaka Cement Co., Ltd., Chiyoda-ku (JP); National Institute for Materials Science, Tsukuba-shi (JP); National Institute of Information and Communications Technology, Koganei (JP)

( * ) Notice: Subject to any disclaimer, the term of this patent is extended or adjusted under 35 U.S.C. 154(b) by 0 days.

(21) Appl. No.: 11/983,071

(22) Filed: Nov. 7, 2007

(65) Prior Publication Data
US 2008/0212915 A1    Sep. 4, 2008

(30) Foreign Application Priority Data
Nov. 8, 2006    (JP)    ............................. 2006-302327

(51) Int. Cl.
*G02F 1/035* (2006.01)
(52) U.S. Cl. .............................................. 385/3; 385/2
(58) Field of Classification Search ....................... None
See application file for complete search history.

(56) References Cited

U.S. PATENT DOCUMENTS 5,995,685 A * 11/1999 Seino ............................ 385/3
7,400,787 B2 * 7/2008 Burns ............................ 385/3

FOREIGN PATENT DOCUMENTS

JP    2004-245750    9/2004

OTHER PUBLICATIONS

Oikawa, Satoshi, et al., Zero-Chirp Broadband Z-Cut Ti:LiNbO3 Optical Modulator Using Polarization Reversal and Branch Electrode, Journal of Kightwave Technology, vol. 23, No. 9, Sep. 2005, pp. 2756-2760.

* cited by examiner

*Primary Examiner*—Omar Rojas
(74) *Attorney, Agent, or Firm*—Chapman and Cutler LLP

(57) ABSTRACT

A nested modulator is provided where the circuit arrangement of modifying electrodes including signal electrodes is simplified, and at the same time, the drive voltage can be lowered.

A nested modulator, including: a substrate 20 made of a material having electro-optic effects; an optical waveguide formed on the substrate; and a modulating electrode for modulating light waves which are guided through the optical waveguide, wherein the optical waveguide has a main Mach-Zehnder waveguide 1 and sub-Mach-Zehnder waveguides 2 and 3 provided on two branching waveguides of the main Mach-Zehnder waveguide, and the modulating electrode is provided in a sub-branching waveguide of the sub-Mach-Zehnder waveguides, is characterized in that a polarization reversal region 46 or 47 is formed in a portion of a sub-branching waveguide of each of the sub-Mach-Zehnder waveguides, the modulating electrode is formed of signal electrodes including introduced signal electrodes 40 or 43, branching single electrodes 41 or 44 and lead signal electrodes 42 or 45 as well as ground electrodes for each of sub-Mach-Zehnder waveguides, and the branching signal electrodes which branch from the introduced signal electrode are placed so as to work on two sub-branching waveguides for each of the sub-Mach-Zehnder waveguides.

4 Claims, 4 Drawing Sheets

NESTED MODULATOR

Priority is claimed to Japan Pat. App. No. 2006-302327 filed Nov. 8, 2006, and the entire disclosure thereof is incorporated herein by reference.

BACKGROUND OF THE INVENTION

1. Field of the Invention

The present invention relates to a nested modulator where sub-Mach-Zehnder waveguides are incorporated into the two branching waveguides of the main Mach-Zehnder waveguide.

2. Description of the Related Art

In conventional optical communication technology and optical measurement technology, SSB (single side band) modulators, which are a type of nested modulators where sub-Mach-Zehnder waveguides (hereinafter, referred to as "sub-MZ waveguides") are incorporated into the two branching waveguides of the main Mach-Zehnder waveguide (hereinafter, referred to as "main MZ waveguide"), are used. As disclosed in the following Patent Document 1, these make it possible to suppress a specific spectrum of the modulated light (discrete spectrum of frequency $\omega+n\Omega$, where n is an integer) emitted from the main MZ waveguide by introducing, for example, light waves having frequency $\omega$ into the main MZ waveguide 1, and at the same time, applying an RF signal (frequency $\Omega$) $RF_A$ having a single frequency and a signal $RF_B$ which is gained by carrying out Hilbert conversion on this RF signal to the two sub-MZ optical waveguides 2 and 3, and thus, adjusting the DC biases $DC_A$, $DC_B$ and $DC_C$, which are applied to the main MZ waveguide and the respective sub-MZ waveguides (see FIG. 1). In addition, the nest type modulators include an FSK modulator and a DQPSK modulator where an RF signal $RF_C$ is applied instead of the DC bias $DC_C$ of FIG. 1.

Patent Document 1: Japanese Unexamined Patent Publication 2004-245750

In the case where an X cut plate is used as the substrate of a nested modulator as shown in FIG. 2, however, signal electrodes, which are modulating electrodes, are formed in locations 15 and 16 on the sub-branching waveguides 11 and 12 as well as 13 and 14 of the respective sub-MZ waveguides 2 and 3 on the substrate 10, and furthermore, ground electrodes are formed in locations 17, 18 and 19. Here, FIG. 2 is a cross sectional diagram showing the nested modulator of FIG. 1 along one dot chain line A.

In the case of FIG. 2, only a single signal electrode is formed for each sub-MZ waveguide, and therefore, the waveguides and the signal electrodes are at a distance from each other, and thus, there is a disadvantage in that the drive voltage becomes high though there is an advantage in that the structure becomes relatively simple.

In contrast, in the case where a Z cut plate is used as the substrate of a nested modulator as shown in FIG. 3, it becomes possible to locate signal electrodes 26, 27, 28 and 29 in close proximity to each of the sub-branching waveguides 21 and 22 as well as 23 and 24 of the respective sub-MZ waveguides 2 and 3 on the substrate 20, and therefore, it becomes possible to lower the drive voltage. Here, 25 indicates a buffer layer.

However, it is necessary to always secure two signal electrodes for each of the sub-MZ waveguides 2 and 3, making complicated the wiring of the signal electrodes, and in addition, it is necessary to apply a modulating signal in the opposite phase to each of the sub-branching waveguides, and therefore, it is very difficult to adjust the length of the signal electrode between the signal entrance and the portion in which the electrical field created by the electrode works on the optical waveguide.

An object of the present invention is to solve the above described problems and provide a nested modulator where the circuit arrangement of the modulating electrodes including signal electrodes is simplified, and it is made possible to lower the drive voltage.

SUMMARY OF THE INVENTION

The invention according to a first aspect of the present invention provides a nested modulator, including: a substrate made of a material having electro-optic effects; an optical waveguide formed on the substrate; and a modulating electrode for modulating light waves which are guided through the optical waveguide, wherein the optical waveguide has a main Mach-Zehnder waveguide and sub-Mach-Zehnder waveguides provided on two branching waveguides of the main Mach-Zehnder waveguide, and the modulating electrode is provided in a sub-branching waveguide of the sub-Mach-Zehnder waveguides, characterized in that a polarization reversal region is formed in a portion of a sub-branching waveguide of each of the sub-Mach-Zehnder waveguides, the modulating electrode is formed of signal electrodes including introduced signal electrodes, branching single electrodes and lead signal electrodes as well as ground electrodes for each of sub-Mach-Zehnder waveguides, and the branching signal electrodes which branch from the introduced signal electrode are placed so as to work on two sub-branching waveguides for each of the sub-Mach-Zehnder waveguides.

The invention according to a second aspect of the present invention provides the nested modulator according to the first aspect of the present invention, characterized in that the working length along which an electrical field formed by the above described branching signal electrode works on the sub-branching waveguides is set equal for each of the sub-Mach-Zehnder waveguides.

The invention according to a third aspect of the present invention provides the nested modulator according to the first or second aspect of the present invention, characterized in that the substrate is a Z cut plate made of lithium niobate or lithium tantalate, and the branching signal electrodes are placed above the sub-branching waveguides, respectively.

In accordance with the invention according to the first aspect of the present invention, a polarization reversal region is formed in a portion of a sub-branching waveguide of each of the sub-Mach-Zehnder waveguides, the modulating electrode is formed of signal electrodes including introduced signal electrodes, branching single electrodes and lead signal electrodes as well as ground electrodes for each of sub-Mach-Zehnder waveguides, and the branching signal electrodes which branch from the introduced signal electrode are placed so as to work on two sub-branching waveguides for each of the sub-Mach-Zehnder waveguides, and therefore, a single signal electrode is introduced into each of the sub-MZ waveguides, thus making the wiring of the electrodes simple. In addition, in each of the sub-MZ waveguides, an efficient modulation operation can be implemented using polarization reversal of the substrate and the branching signal electrode, and the drive voltage can be lowered in the same manner as in the case where a signal electrode is provided for each sub-branching waveguide.

In accordance with the invention according to the second aspect of the present invention, the working length along which an electrical field formed by the above described branching signal electrode works on the sub-branching waveguides is set equal for each of the sub-Mach-Zehnder waveguides, and therefore, it becomes possible to easily implement optical modulation in a state of opposite phases where the modulation intensity is equal in the two sub-branching waveguides within each sub-MZ waveguide only by forming a polarization reversal region in a portion of the sub-branching waveguides, and at the same time, forming a signal electrode which works on each of the sub-branching waveguides by branching the introduced signal electrode.

In accordance with the invention according to the third aspect of the present invention, the substrate is a Z cut plate made of lithium niobate or lithium tantalate, and the branching signal electrodes are placed above the sub-branching waveguides, respectively, and therefore, polarization reversal of the substrate can be easily implemented, and at the same time, it becomes possible to provide a nested modulator having an extremely high modulation efficiency.

REFERENCE NUMERALS

Figure 1:
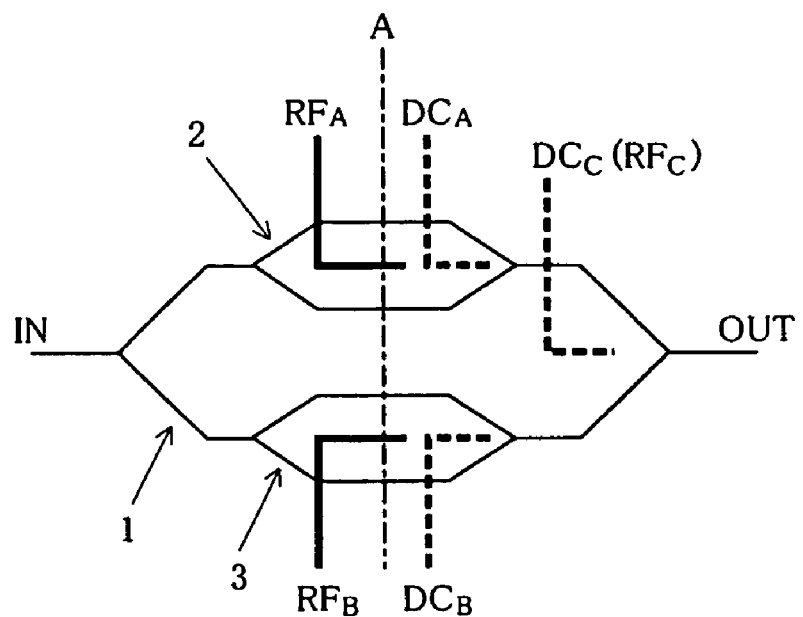
FIG. 1 is a diagram showing the principle of a nested modulator.
Figure 2:
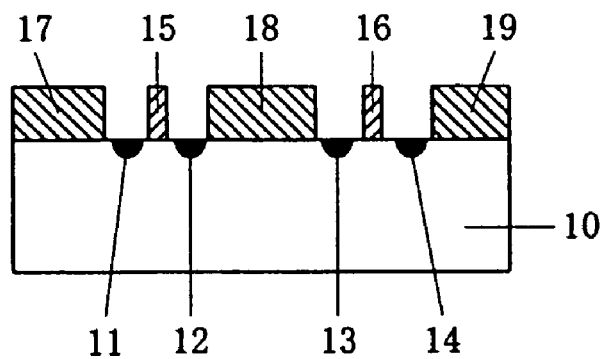
FIG. 2 is a cross sectional diagram showing a nested modulator using a conventional X cut plate.
Figure 3:
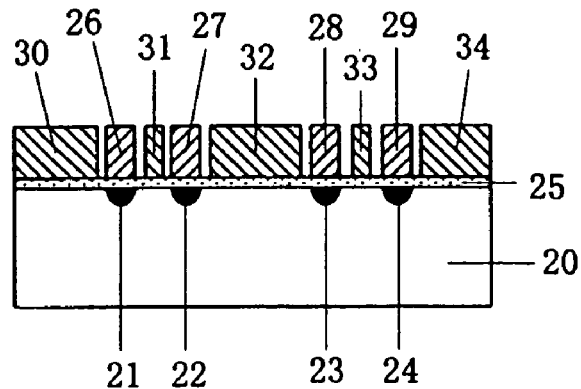
FIG. 3 is a cross sectional diagram showing a nested modulator using a conventional Z cut plate.

1: main MZ waveguide
2, 3: sub-MZ waveguides
20: substrate
40, 43: introduced signal electrodes
41, 44: branching signal electrodes
42, 45: lead signal electrodes
46, 47: polarization reversal regions

DESCRIPTION OF THE PREFERRED EMBODIMENTS

The nested modulator according to the present invention is described in detail in the following.

Figure 4:
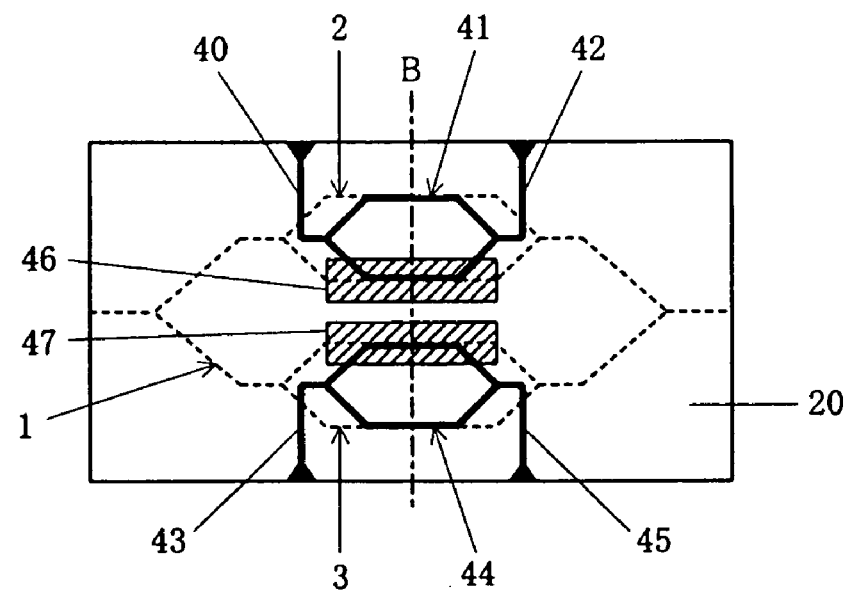
FIG. 4 is a plan diagram showing the nested modulator according to the present invention.
Figure 5:
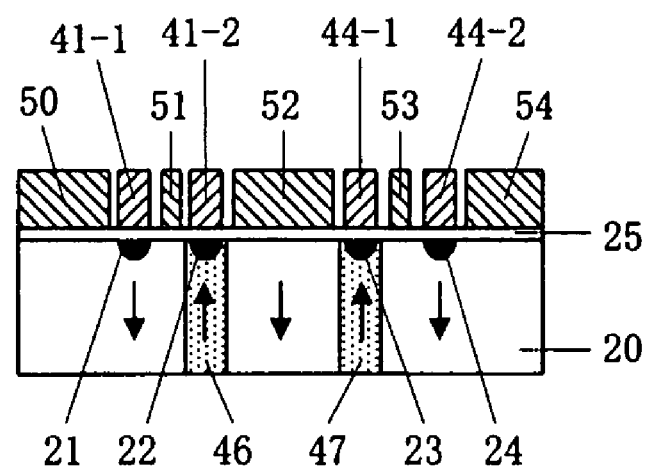
FIG. 5 is a cross sectional diagram showing the nested modulator according to the present invention.

FIG. 4 is a schematic plan diagram showing the nested modulator according to the present invention, and FIG. 5 is a cross sectional diagram showing the nested modulator along one dot chain line B of FIG. 4.

The substrate 20 is a substrate having electro-optic effects which is formed of, for example, a lithium niobate, a lithium tantalate, PLZT (lead lanthanum zirconate titanate) or a quartz based material, concretely formed of an X cut plate, a Y cut plate or a Z cut plate of any of these single crystal materials, and in particular, it is preferable to use lithium niobate (LN) or lithium tantalate because it is easy to form an optical waveguide device of which the anisotropy is great. In addition, the below described ease of providing polarization reversal is taken into consideration, and FIG. 5 shows an example where a Z cut plate is used.

Optical waveguides in such forms that sub-MZ waveguides 2 and 3 are incorporated into the two branching waveguides of the main MZ waveguide 1 are formed on the substrate 20, and these optical waveguides can be formed by diffusing Ti or the like in the surface portion of the substrate in accordance with a thermal diffusion method or a proton exchanging method. In addition, it is possible to form signal electrodes (40 to 45), ground electrodes (50 to 54) surrounding the signal electrodes which form modulating electrodes and DC bias electrodes (not shown) for applying a DC bias through the formation of an electrode pattern of Ti.Au or in accordance with a gold plating method. Furthermore, it is also possible to provide a buffer layer 25, such as a dielectric $SiO_2$, on the surface of the substrate after the formation of the optical waveguides or a ridge structure so that an electrical field formed by the signal electrodes is efficiently applied to the waveguides, if necessary.

As shown in FIG. 5, polarization reversal regions 46 and 47 of the substrate are formed in portions of sub-branching waveguides 22 and 23, each of which is one of the respective sub-MZ waveguides from among the sub-branching waveguides 21 to 24. The directions of the spontaneous polarizations within the crystals of the substrate are indicated by the arrows shown within the substrate 20 in FIG. 5.

Figure 6:
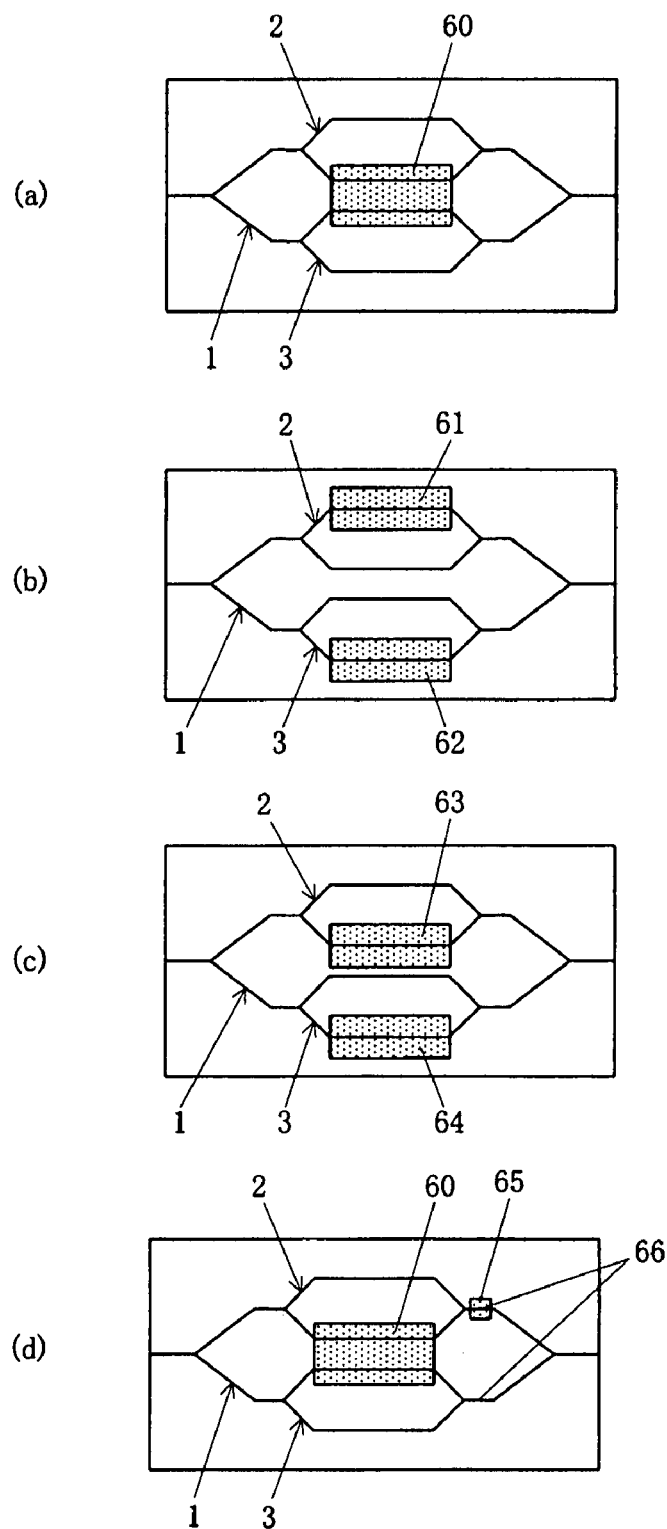
FIGS. 6(a) to 6(d) are diagrams showing examples of polarization reversal regions formed in the nested modulator according to the present invention.

Here, the regions where polarization reversal is provided are not limited to the regions in FIG. 4, and it is possible to select various types of polarization reversal regions 60 to 65 for the main MZ waveguide 1 and the sub-MZ waveguides 2 and 3 which form the nested modulator, for example, as shown in FIGS. 6(a) to 6(d). In FIG. 6(d), a polarization reversal region 65 is formed and the same DC bias or RF signal is applied to portions 66 in the main MZ waveguide, and thus, it becomes possible to lower the bias voltage or the drive voltage.

Next, the form of the signal electrodes in the nested modulator according to the present invention is described.

Single signal electrodes 40 and 43 are individually introduced to the sub-branching waveguides 21 to 24 of each of the sub-MZ waveguides 2 and 3, and at the same time, the signal electrodes 41 and 44 (41-1 and 41-2 as well as 44-1 and 44-2 in FIG. 5) which branch from the introduced signal electrodes 40 and 43 are arranged on each of the sub-branching waveguides so as to work on the two sub-branching waveguides of each of the sub-MZ waveguides 2 and 3 (21 and 22 as well as 23 and 24 in FIG. 5). Furthermore, the branching signal electrodes (41-1 and 41-2 as well as 44-1 and 44-2) merge with each of the sub-MZ waveguides and are connected to terminals via lead electrodes 42 and 45. Here, it is also possible for the branching signal electrodes to be directly connected to the terminals without merging as described above in the configuration.

Due to the form of these signal electrodes, a single signal electrode is introduced to each of the sub-MZ waveguides, and therefore, the circuit arrangement with the wiring of electrodes can be simplified.

In the nested modulator according to the present invention, the above described provision of polarization reversal and the form of the branching signal electrodes allow a modulating signal having the same modulation intensity in opposite phases to be applied to the two sub-branching waveguides in each of the sub-MZ waveguides, and an efficient modulation operation can be implemented and the drive voltage can be lowered in the same manner as in the case where a signal electrode is provided for each sub-branching waveguide. In particular, the working length along which an electrical field formed by the branching signal electrodes works on the sub-branching waveguides can be set equal for each sub-MZ waveguide, and thus, it becomes possible to always implement optical modulation in a state of opposite phases of which the modulation intensity is equal for light waves which propagate through the two sub-branching waveguides within each of the sub-MZ waveguides.

As described above, the present invention can provide a nested modulator where the circuit arrangement of modulating electrodes including signal electrodes can be simplified and the drive voltage can be lowered.

The invention claimed is:

1. A nested modulator, comprising:
a substrate made of a material having electro-optic effects;
an optical waveguide formed on the substrate; and
a modulating electrode for modulating light waves which are guided through the optical waveguide,
said optical waveguide comprising
a main Mach-Zehnder waveguide, and
a plurality of sub-Mach-Zehnder waveguides provided on two branching waveguides of the main Mach-Zehnder waveguide,
said each sub-Mach-Zehnder waveguide comprising two sub-branching waveguides, and
said modulating electrode being provided in a sub-branching waveguide of the sub-Mach-Zehnder waveguides, wherein
a polarization reversal region is formed in a portion of one of said two sub-branching waveguides on a same side of each of the plurality of sub-Mach-Zehnder waveguides,
the modulating electrode is formed of signal electrodes including introduced signal electrodes, branching signal electrodes and lead signal electrodes, as well as ground electrodes for each of sub-Mach-Zehnder waveguides, and
the branching signal electrodes that branch from the introduced signal electrode are positioned so that said branching signal electrodes that branch from the introduced signal electrode work on said two sub-branching waveguides for each of the sub-Mach-Zehnder waveguides.

2. The nested modulator according to claim 1, wherein a working length along which an electrical field formed by said branching signal electrodes that branch from the introduced signal electrode works on the sub-branching waveguides is set to be equal for each of the sub-Mach-Zehnder waveguides.

3. The nested modulator according to claim 1, wherein
the substrate is a Z cut plate made of lithium niobate or lithium tantalate, and
the branching signal electrodes that branch from the introduced signal electrode are each positioned above the sub-branching waveguides, respectively.

4. The nested modulator according to claim 2, wherein
the substrate is a Z cut plate made of lithium niobate or lithium tantalate, and
the branching signal electrodes that branch from the introduced signal electrode are each positioned above the sub-branching waveguides, respectively.

* * * * *